(12) United States Patent
Mishra et al.

(10) Patent No.: US 11,909,833 B2
(45) Date of Patent: Feb. 20, 2024

(54) MULTI CLOUD CONNECTIVITY SOFTWARE FABRIC FOR AUTONOMOUS NETWORKS

(71) Applicant: A5G Networks, Inc., Nashua, NH (US)

(72) Inventors: Rajesh Kumar Mishra, Westford, MA (US); Kaitki Agarwal, Westford, MA (US)

(73) Assignee: A5G Networks, Inc., Nashua, NH (US)

( * ) Notice: Subject to any disclaimer, the term of this patent is extended or adjusted under 35 U.S.C. 154(b) by 0 days.

(21) Appl. No.: 18/057,671

(22) Filed: Nov. 21, 2022

(65) Prior Publication Data

US 2023/0164227 A1   May 25, 2023

Related U.S. Application Data (60) Provisional application No. 63/282,084, filed on Nov. 22, 2021.

(51) Int. Cl.
 *H04L 67/51* (2022.01)
(52) U.S. Cl.
 CPC .................................. *H04L 67/51* (2022.05)
(58) Field of Classification Search
 CPC ....................................................... H04L 67/51
 See application file for complete search history.

(56) References Cited

U.S. PATENT DOCUMENTS

| | | | | |
|---|---|---|---|---|
| 2017/0142591 | A1* | 5/2017 | Vrzic | H04W 24/02 |
| 2021/0258861 | A1* | 8/2021 | Wang | H04L 67/51 |
| 2022/0058012 | A1* | 2/2022 | Kaushik | H04L 63/029 |
| 2022/0272537 | A1* | 8/2022 | Aggarwal | H04L 63/0281 |
| 2022/0400358 | A1* | 12/2022 | Son | H04L 67/51 |

FOREIGN PATENT DOCUMENTS

| | | | | |
|---|---|---|---|---|
| CN | 111901367 | A * | 11/2020 | H04L 41/0816 |
| CN | 114026834 | A * | 2/2022 | G06F 1/206 |
| CN | 114915653 | A * | 8/2022 | |
| WO | WO-2022152367 | A1 * | 7/2022 | |

* cited by examiner

*Primary Examiner* — Kevin T Bates
*Assistant Examiner* — Ranjan Pant
(74) *Attorney, Agent, or Firm* — Schwegman Lundberg & Woessner, P.A.

(57) ABSTRACT

The present disclosure describes an artificial intelligence (AI)/machine learning (ML) based distributed, hybrid, and multi-cloud software fabric-based system that unifies the communication infrastructure across hybrid and multi clouds. This mobile connectivity software fabric allows operators to modernize their networks to bring significant operational savings while rolling out new mobile services. This fabric can enable small independent networks and allow them to seamlessly connect with public networks, and it can enable network of networks while keeping the underlying compute and heterogeneity unified.

18 Claims, 7 Drawing Sheets

MULTI CLOUD CONNECTIVITY SOFTWARE FABRIC FOR AUTONOMOUS NETWORKS

CLAIM OF PRIORITY

This application claims the benefit of priority to U.S. Provisional Patent Application Ser. No. 63/282,084, filed on Nov. 22, 2021, and entitled "Multi Cloud Connectivity Software Fabric with Machine Learning Based Intelligence for Wireless and Wireline," which is incorporated herein by reference in its entirety.

TECHNOLOGY FIELD

The disclosed subject matter is related generally to methods and systems for distributed, local, hybrid, and multi-cloud software, such as Software as a Service (SAAS), for wireless networks using, for example, machine-learning algorithms.

BACKGROUND

As cloud-based services and user consumption of data grows, operators are looking to save cost and provide scalable solutions that can also serve enterprises (also referred to as private networks). Conventional systems are primarily hosted locally or on a single cloud provider. These conventional systems do not allow seamless enterprise integration with operator networks (also referred to as public networks). Each operator, instead, typically have their own walled or siloed networks with mere roaming agreements with other operators.

With large amounts of data and the need for low-latency services, networks are becoming distributed, and more functionality is moving towards the edge or closer to the user rather than at central locations. 5G has broader impacts than any other mobile technologies we have used in the past. It is bringing many new services not just in the telecommunication domain, but other sectors as well such as healthcare and others. Industrial automation is being realized via private networks, smart cities are being planned, and networks with connected cars are being implemented. With the realization of these services, smaller independent networks are being designed. All these small and independent networks will need seamless connectivity with the public mobile and fixed networks, and require service continuity across these heterogenous networks.

To add another dimension, some of these networks will be realized using public cloud service providers using hybrid clouds, edge clouds and far edge clouds. The networks may also be realized using private cloud service providers. Serverless computing is separating applications from the underlying compute. While the cloud infrastructure can be built to scale and primarily on distributed software practices, it is not built for and is not robust enough for many use desired cases and services in the 5G network. Fault containment can be challenging. The current network functions are not edge native and not built for the disaggregated and decentralized network. The current network functions cannot meet the quality-of-service and revenue expectations, and also cannot provide the seamless service interaction across hybrid and multi-cloud environments.

SUMMARY

The present disclosure describes a method comprising: receiving a connection request from a client service and connecting the client service to a discovery layer of a service node; determining, by the discovery layer, a service type and resource demand from the client using; selecting, by the discovery layer, control layer functions from a control layer pool distributed across a plurality of service nodes using at least a first machine-learning model trained for the discovery layer; selecting, by the control layer, data layer functions from a data layer pool distributed across a plurality of service nodes using at least a second machine-learning model trained for the control layer; selecting, by the data layer, a data egress point to offer the client service using at least a third machine-learning model trained for the data layer; and providing the client service using the selected control layer functions, data layer functions, and data egress point.

The present disclosure also describes a system comprising at least one hardware processor; and at least one memory storing instructions that, when executed by the at least one hardware processor cause the at least one hardware processor to perform actions comprising: receiving a connection request from a client service and connecting the client service to a discovery layer of a service node; determining, by the discovery layer, a service type and resource demand from the client using; selecting, by the discovery layer, control layer functions from a control layer pool distributed across a plurality of service nodes using at least a first machine-learning model trained for the discovery layer; selecting, by the control layer, data layer functions from a data layer pool distributed across a plurality of service nodes using at least a second machine-learning model trained for the control layer; selecting, by the data layer, a data egress point to offer the client service using at least a third machine-learning model trained for the data layer; and providing the client service using the selected control layer functions, data layer functions, and data egress point.

The present disclosure further describes a machine-storage medium embodying instructions that, when executed by a machine, cause the machine to perform actions comprising: receiving a connection request from a client service and connecting the client service to a discovery layer of a service node; determining, by the discovery layer, a service type and resource demand from the client using; selecting, by the discovery layer, control layer functions from a control layer pool distributed across a plurality of service nodes using at least a first machine-learning model trained for the discovery layer; selecting, by the control layer, data layer functions from a data layer pool distributed across a plurality of service nodes using at least a second machine-learning model trained for the control layer; selecting, by the data layer, a data egress point to offer the client service using at least a third machine-learning model trained for the data layer; and providing the client service using the selected control layer functions, data layer functions, and data egress point.

BRIEF DESCRIPTION OF FIGURES

Various ones of the appended drawings merely illustrate example implementations of the present disclosure and should not be considered as limiting its scope.

DETAILED DESCRIPTION

The present disclosure describes an artificial intelligence (AI)/machine learning (ML) based distributed, hybrid, and multi-cloud software fabric-based system that unifies the communication infrastructure across hybrid and multi clouds. This mobile connectivity software fabric allows operators to modernize their networks to bring significant operational savings while rolling out new mobile services. This mobile connectivity software fabric will provide advantages including increasing average revenue per use (ARPU), adding new revenue coming from the advanced services, and adding savings on data center energy consumption. This fabric can enable small independent networks and allow them to seamlessly connect with public networks, and it can enable network of networks while keeping the underlying compute and heterogeneity unified.

Figure 1:
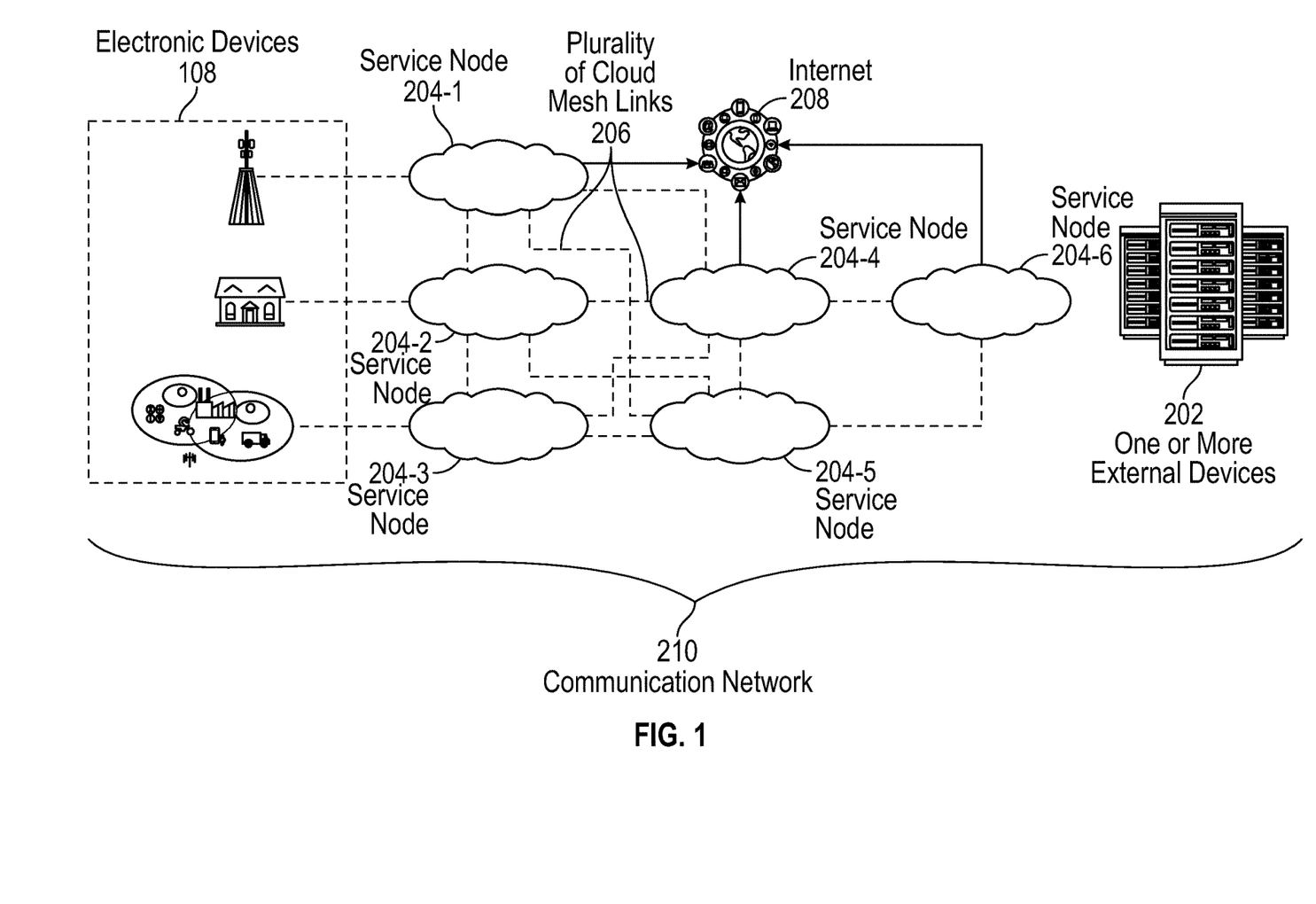
FIG. 1 is a schematic representation of an exemplary cloud system autonomous data and signaling traffic management in a distributed infrastructure, in accordance with some embodiments of the present disclosure.

FIG. 1 is a schematic representation of an exemplary cloud system autonomous data and signaling traffic management in a distributed infrastructure, in accordance with some embodiments of the present disclosure. The cloud infrastructure 200 includes one or more external devices 202 communicatively coupled to a plurality of service nodes 204-1, 204-2, 204-3, 204-4, 204-5 . . . 204-N via a transport network. For the sake of present description, the plurality of service nodes 204-1, 204-2, 204-3, 204-4, 204-5 . . . 204-N have been represented as the plurality of service nodes 204. In some embodiments of the present disclosure, the plurality of service nodes 204 may host a set of network functions including 4G, 5G or Wi-Fi network functions, such as Mobility Management Entity (MME), Signaling Gateway (SGW), Packet Gateway (PGW), Home Subscriber Server (HSS), Policy and Charging Rules Function (PCRF), Evolved Packet Data Gateway (ePDG), Trusted Wireless Access Gateway (TWAG), Centralized Unit (CU), Access & Mobility Management Function (AMF), Session Management Function (SMF), User Plane Function (UPF), Non-3GPP Interworking Function (N3IWF), Network Data Analytics Function (NWDAF), Network Repository Functions (NRF), Network Slicing Selection Function (NSSF), Network Exposure Function (NEF), Unified Data Management (UDM), Authentication Server Function (AUSF), Point Coordination Function (PCF) and the like. In some embodiments, the one or more external devices 202 may include one or more local servers, one or more cloud servers, compute nodes, content data network, internet, the set of network functions, one or more proxy servers and the like. The one or more external devices 202 are configured to host one or more services accessible by the plurality of service nodes 204.

Further, each of the plurality of service nodes 204 may act as a computing system including a plurality of modules to handle various functionality, as described herein. In some embodiments of the present disclosure, the one or more data centers may correspond to private cloud, public cloud, hybrid cloud and the like. Furthermore, the plurality of service nodes 204 are connected with each other via a plurality of cloud mesh links 206. The plurality of cloud mesh links 206 are secured ad hoc routing connections, such as Open Shortest Path First (OSPF) and the like between the plurality of service nodes 204. In some embodiments of the present disclosure, the plurality of service nodes 204 may include multiple physical parameters characterizing the plurality of service nodes 204 and compute one or more system parameters, such as energy requirement, power utilization, processing type, processing power, configuration and the like. Further, each of the plurality of service nodes 204 may have their own state information and characteristics, such as delay, jitter, packet flow information, protocol parameter information, quality of experience and the like, known as one or more network function parameters. In some embodiments of the present disclosure, one or more external inputs or parameters are received by a computing system via internet 208. Furthermore, the one or more system parameters, the one or more network function parameters and the one or more external inputs or parameters are one or more computing system parameters.

In some embodiments of the present disclosure, the service node 204-1, the service node 204-2 and the service node 204-3 are far edge clouds at first level of hierarchy within the cloud infrastructure 200. The first level of hierarchy corresponds to a first proximal distance from the one or more electronic devices 108. Further, the service node 204-4 and the service node 204-5 are regional edge clouds at second level of hierarchy within the cloud infrastructure 200. In some embodiments of the present disclosure, the second level of hierarchy corresponds to a second proximal distance from the one or more electronic devices 108. In some embodiments of the present disclosure, the service node 204-6 is closer to the one or more external devices 202. The service node 204-6 is at third level of hierarchy within the cloud infrastructure 200. In some embodiments of the present disclosure, the third level of hierarchy corresponds to a third proximal distance from the one or more electronic devices 108. In some embodiments of the present disclosure, the one or more external devices 202 may be main data center. In some embodiments of the present disclosure, each of the plurality of service nodes 204 is connected to the internet 208, as shown in FIG. 1.

Further, the cloud infrastructure 200 includes one or more orchestrator nodes connected to the plurality of service nodes 204 via a set of cloud mesh links. In some embodiments of the present disclosure, each of the one or more orchestrator nodes is an instance of a collective group of network functions hosted on the one or more data centers.

Furthermore, the cloud infrastructure 200 includes one or more electronic devices 108 associated with an organization connected to a communication network 210 via a communication channel. In some embodiments of the present disclosure, the communication network 210 may be private network, public network, smart city network, connected car network, Fixed Wireless Access (FWA) and the like. In some embodiments of the present disclosure, the one or more electronic devices 108 are connected to the plurality of service nodes 204. The one or more electronic devices 108 may be used by one or more users associated with the organization to access the communication network 210 for accessing one or more services hosted on the internet 208. In some embodiments of the present disclosure, the one or more external devices 202 are located nearby to the organization. In some embodiments of the present disclosure, the one or more electronic devices 108 may include a laptop computer, desktop computer, tablet computer, smartphone, wearable device, smart watch and the like. In some embodiments of the present disclosure, the one or more electronic devices 108 may also include a microprocessor, a server and the like. Further, the one or more electronic devices 108 include a local browser, a mobile application or a combination thereof. The one or more users may use a web application via the local browser, the mobile application or a combination thereof to communicate with the computing system. In some embodiments of the present disclosure, the one or more electronic devices 108 may access the computing system via a radio access network.

In some embodiments of the present disclosure, the computing system receives a request from the one or more electronic devices 108 within the communication network 210 to access the one or more services hosted on the one or more external devices 202 or a set of services hosted on the internet 208. Further, the computing system determines one or more network parameters based on the received request, one or more device parameters and the one or more computing system parameters by using a trained traffic management based Machine Learning (ML) model. The computing system also determines current network demand within the cloud infrastructure 200 based on the received request by using the trained traffic management based ML model. The computing system determines one or more service nodes at multiple levels of hierarchy within the cloud infrastructure 200 from the plurality of service nodes 204 based on the determined one or more network parameters and the determined current network demand by using the trained traffic management based ML model. In an embodiment of the present disclosure, the one or more service nodes at first level of hierarchy within the cloud infrastructure 200 are service node 204-1, service node 204-2 and service node 204-3, service node 204-4, service node 204-5 and service node 204-6. Furthermore, the computing system dynamically establishes one or more cloud mesh links between the determined one or more service nodes 204-1, 204-2, 204-3, 204-4, 204-5 and 204-6 at the multiple levels of hierarchy and the one or more external devices 202 based on the determined one or more network parameters and the current network demand by using the trained traffic management based ML model. The multiple levels of hierarchy comprises first level, second level, third level of hierarchy and the like. The computing system processes the received request by providing access of the one or more services hosted on the one or more external devices 202 to the one or more electronic devices 108 via the established one or more cloud mesh links.

Figure 2:
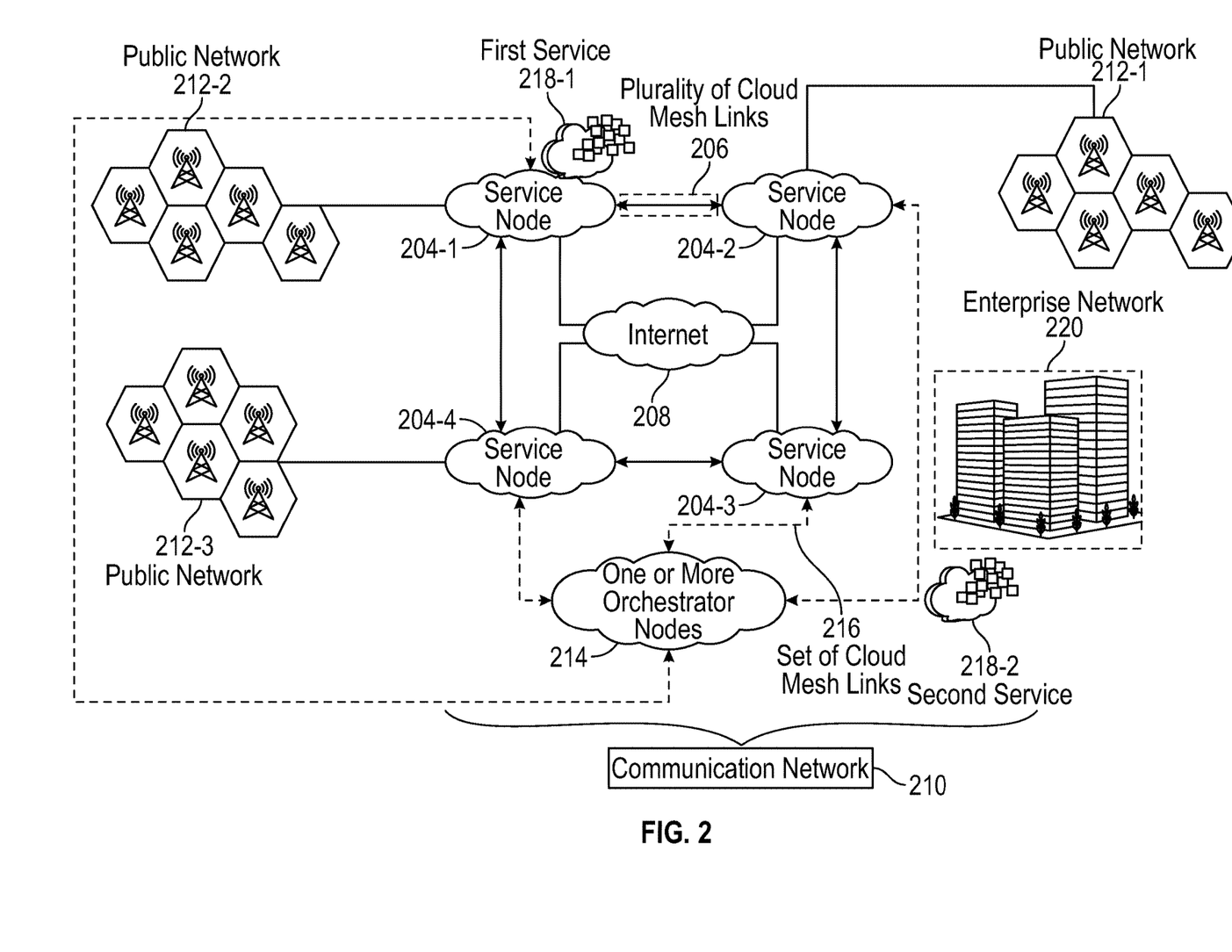
FIG. 2 is a schematic representation of a cloud infrastructure for autonomous data and signaling traffic management in a distributed infrastructure, in accordance with some embodiments of the present disclosure.

FIG. 2 is a schematic representation of a cloud infrastructure 200 for autonomous data and signaling traffic management in a distributed infrastructure, in accordance with some embodiments of the present disclosure. The cloud infrastructure 200 includes the plurality of service nodes 204-1, 204-2, 204-3 and 204-4. For the sake of present description, the plurality of service nodes 204-1, 204-2, 204-3 and 204-4 have been represented as the plurality of service nodes 204.

The service node 204-3 is an enterprise cloud associated with the organization. Further, the service node 204-4 is a far edge cloud located at a distant position from the organization. The cloud infrastructure 200 includes the one or more electronic devices 108 associated with the organization connected to the communication network 210 via the communication channel. In some embodiments of the present disclosure, the communication network 210 is a 4G, 5G, 6G and WiFi network with the set of network functions including multiple 4G, 5G, 6G and WiFi network functions running on variety of cloud and compute infrastructures. Furthermore, the cloud infrastructure 200 includes a first public network 212-1, a second public network 212-2 and a third public network 212-3 to communicatively couple the one or more external devices 202 to the plurality of service nodes 204. In some embodiments of the present disclosure, the second public network 212-2 is shorter public network. The plurality of service nodes 204 are connected with each other via the plurality of cloud mesh links 206 and the internet 208. Further, the one or more orchestrator nodes 214 are connected to the plurality of service nodes 204 via a set of cloud mesh links 216. The one or more external devices 202 host a first service 218-1 and a second service 218-2 accessible by the plurality of service nodes 204. In some embodiments of the present disclosure, the plurality of service nodes 204 may also be communicatively coupled with one or more operator networks to achieve seamless integration of the one or more electronic devices 108 with the one or more operator networks.

In some embodiments of the present disclosure, the computing environment 200 is applicable in telecommunication, healthcare, manufacturing, transport, public safety domains and the like. As described above, the computing environment 200 includes the plurality of service nodes 204-1, 204-2, 204-2 and 204-4. For the sake of present description, the plurality of service nodes 204-1, 204-2, 204-3 and 204-4 have been represented as the plurality of service nodes 204. The service node 204-3 is an enterprise cloud associated with the organization. Further, the service node 204-4 is a far edge cloud located at a distant position from the organization. The computing environment 200 includes one or more electronic devices 108 associated with the organization connected to the enterprise network 220 via the private communication channel. In some embodiments of the present disclosure, the enterprise network is a 4G or 5G or 6G or WiFi network and the like. Furthermore, the computing environment includes a first public network, a second public network and a third public network to communicatively couple the one or more external devices 202 to the plurality of service nodes 204. In some embodiments of the present disclosure, the second public network is shorter public network. The plurality of service nodes 204 are connected with each other via the network 212 and internet. Further, the one or more orchestrator nodes 214 are connected to the plurality of service nodes 204 via the network 212. In some embodiments of the present disclosure, the network 212 may be the one or more cloud mesh links. The one or more external devices 202 host a first public network application 226-1 and a second public network application 226-2 accessible by the plurality of service nodes 204.

Figure 3:
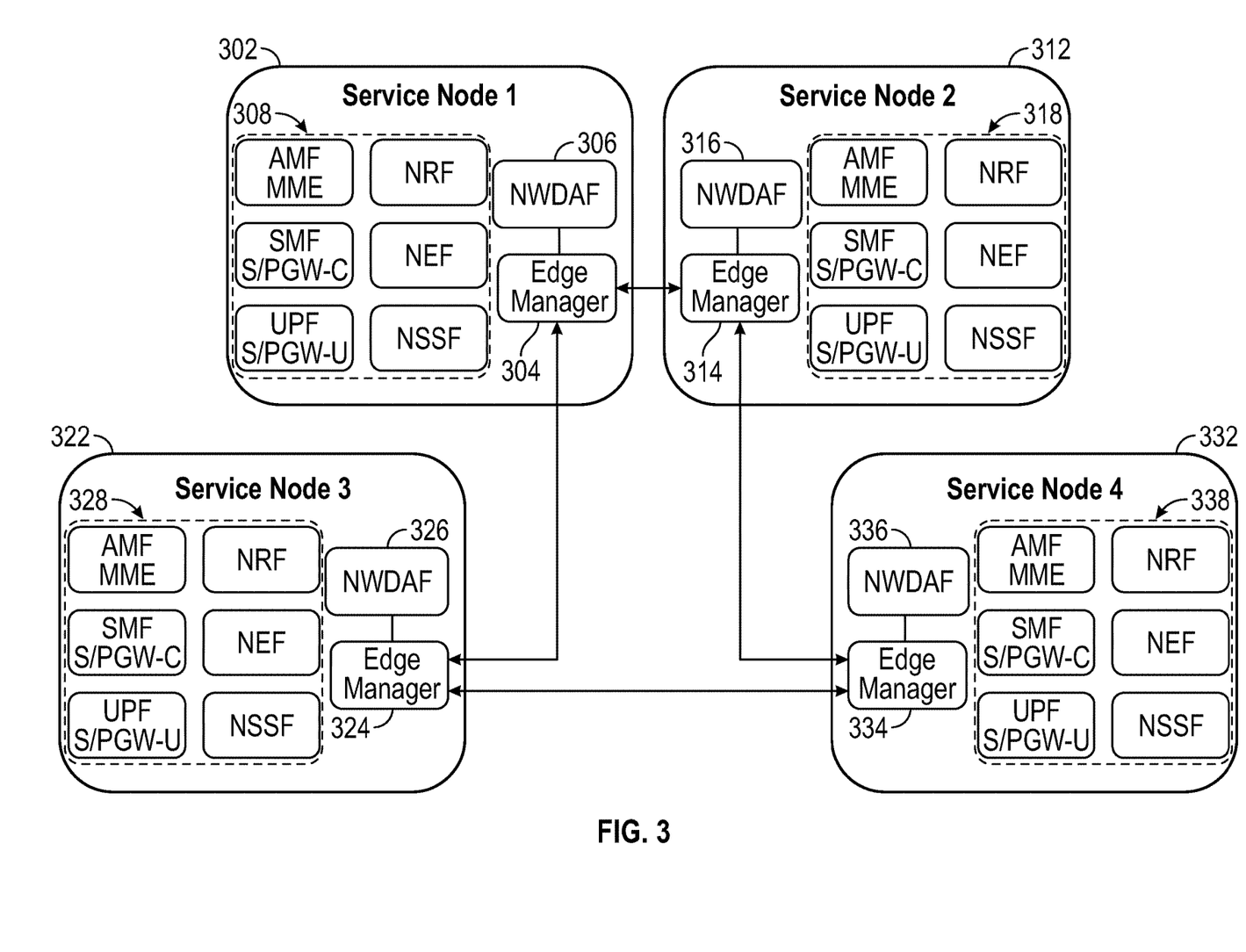
FIG. 3 is a schematic view of service nodes facilitating multi cloud connectivity software fabric for autonomous networks, in accordance with some embodiments of the present disclosure.

FIG. 3 is a schematic view of service nodes facilitating multi cloud connectivity software fabric for autonomous networks, in accordance with some embodiments of the present disclosure. In FIG. 3, four service nodes 302, 312, 322, 332 are shown for illustration purposes only; other number of service nodes may be provided. The service nodes 302, 312, 322, 332 may be provided as public or private (enterprise) networks or a combination thereof, as described in further detail below. As described in further detail below, the mesh connections between the service nodes 302, 312, 322, 332 may provide a connectivity fabric, which may provide a unified communication structure across different cloud systems, such as hybrid and multi-cloud. The connectivity fabric can enable small independent networks, allowing them to seamlessly connect with public networks and enable network of networks while maintaining the underly compute and heterogeneity structure unified. Connectivity fabric is created dynamically using the cloud mesh links and by sharing the information across the cloud mesh links about the different service nodes 302, 312, 322, 332 across different types of data centers and cloud providers.

The connectivity fabric also enables autonomous networks, not just by automating the operations but also for network function behavior and network optimizations, e.g., predictive traffic steering and predictive resource allocation. The system, as described in further detail below, can use ML for different aspects of the smart fabric including, but not limited, to resource allocation, traffic engineering, network management, fault detection and correction, service level optimization.

Service node 302 may include an edge manager 304, a network data analytics function (NWDAF) 306, and shared slice components 308. The shared slice components 308 may include any network function including 4G, 5G or Wi-Fi network functions, such as Access & Mobility Management Function (AMF), Mobility Management Entity (MME), Signaling Gateway (SGW), Packet Gateway (PGW), Home Subscriber Server (HSS), Policy and Charging Rules Function (PCRF), Evolved Packet Data Gateway (ePDG), Trusted Wireless Access Gateway (TWAG), Centralized Unit (CU), Session Management Function (SMF), User Plane Function (UPF), Non-3GPP Interworking Function (N3IWF, Network Repository Functions (NRF), Network Slicing Selection Function (NSSF), Network Exposure Function (NEF), Unified Data Management (UDM), Authentication Server Function (AUSF), Point Coordination Function (PCF) and the like.

The edge manager 304 may provide a communication structure for the connectivity fabric and facilitate interactions with other service nodes and networks, such as private networks and other public networks. The edge manager 304 may communicate with other service nodes (and their respective edge managers) using a communication interface, such as a Cloud Mesh link. The communication interface may be based on webservices, for example, REST based webservices. Edge managers may act as routing agents. In some embodiments, edge managers may take the role of one or more network functions such as S1 proxy, NgAP proxy, MME, SGW, PGW, AMF, SMF, UPF, N3IWF, NRF, NSSF, NEF and the like.

Service node 312 may include an edge manager 314, a NWDAF 316, and shared slice components 318. The shared slice components 318 may include any network function including 4G, 5G or Wi-Fi network functions, such as AMF, MME, SGW, PGW, HSS, PCRF, ePDG, TWAG, CU, SMF, UPF, N3IWF, NRF, NSSF, NEF, UDM, AUSF, PCF and the like.

Service node 322 may include an edge manager 324, a NWDAF 326, and shared slice components 328. The shared slice components 328 may include any network function or combination of these functions including 4G, 5G or Wi-Fi network functions, such as AMF, MME, SGW, PGW, HSS, PCRF, ePDG, TWAG, CU, SMF, UPF, N3IWF, NRF, NSSF, NEF, UDM, AUSF, PCF and the like.

Service node 332 may include an edge manager 334, a NWDAF 336, and shared slice components 338. The shared slice components 338 may include any network function or combination of these functions including 4G, 5G or Wi-Fi network functions, such as AMF, MME, SGW, PGW, HSS, PCRF, ePDG, TWAG, CU, SMF, UPF, N3IWF, NRF, NSSF, NEF, UDM, AUSF, PCF and the like.

The NWDAFs 306, 316, 326, 336 may collect usage data for their respective service nodes, analyze the usage data for network slices, and generate predicted usage information regarding resources, as described in further detail herein. The NWDAFs 306, 316, 326, 336 may execute ML algorithms, as described herein. The NWDAFs 306, 316, 326, 336 may continuously analyze the parameters of each network slice and predict the usage or congestion that may occur at a future time. The prediction results as well as other data may be exchanged via cloud mesh links with other service nodes.

Service nodes 302, 312, 322, 332 may be provided as public and/or private networks or a combination thereof. For example, as explained in detail below, a service node (e.g., service node 302) may be provided as a public network but may provide network slices for a private network in accordance with the dynamic network slice management techniques described herein. Likewise, for example, a service node (e.g., service node 312) may be provided as a private network but may provide network slices for a public network in accordance with the dynamic network slicing techniques described herein.

Autonomous network function management performed by service nodes 302, 312, 322, 332 enables multiple isolated and independent virtual (logical) networks to exist together. In other words, a plurality of virtual networks, i.e., slices, may be created using resources of the same physical network infrastructure. A slice includes shared network components that provides end-to-end connection enabling multiplexing of virtualized and independent logical networks using logical separation. In some embodiments, each network slice may be based on a set of parameters that are part of the SLA of the slice. For example, the set of parameters may include minimum guaranteed bandwidth, maximum end-to-end latency for data packets, guaranteed quality-of-service (QoS), simultaneous maximum number of users, and so on.

Autonomous network function management, as described herein, may monitor one or more key performance indicators (KPIs) of the network slice and allocate and/or update the resources to meet the SLA. For example, the KPIs may be monitored continuously or at a periodic time interval. The periodic time interval may be configurable and/or user specified.

With the advent of 5G, edge networking has gained significance. Accordingly, in some embodiments, service nodes may be provided near the radio access network (RAN), and, therefore, breaking out the customer traffic in the radio network. This may result in achieving better performance experience to the user while at the same time distributing the network processing load amongst a plurality service nodes. Each service node's location can be known as an edge location. For different industry verticals and deployment scenarios there can be different edge types. At high level, this can be referred to as far edge, edge, and regional edge. More specifically, they can be further categorized as telco edge, device edge, critical communication edge, enterprise edge or industrial edge and the likes. Service nodes may be provided at any of these edge locations.

Service nodes 302, 312, 322, 332 may be provided in the same or different edge locations. In some embodiments, a network slice may be managed at each edge location. Resources available at each edge location may be limited, and, therefore, these edge locations may not have endless resources to statically provision each slice and provide the guaranteed SLA.

The techniques described herein enable autonomous behavior in the networks to solve challenges associated with distributed networks. These decentralized networks described herein can be built using AI/ML enabled mobile connectivity fabric and provide agile data distribution with the decentralized databases, seamless data movement, security and policies, data recovery and synchronization. The autonomous techniques combine AI/ML, edge native logic, mobile technologies such as 4G, 5G, 6G and WiFi to determine how to best distribute the workloads across decentralized and distributed networks.

This mobile connectivity fabric can use distributed software-defined networking and leverage a spine and leaf network fabric. The mobile connectivity fabric is an overlay or, in some embodiments, an extension to spine and leaf network fabric and created using mobile technologies such as UPF chaining or cloud mesh links as interconnections to different networks. The mobile connectivity fabric can enable different mobile network functions such as RAN, packet core and voice core network functions, and can be fully programmable. In some embodiments, the mobile connectivity fabric can be built on open philosophy, e.g., leverage open-source software for commoditized functionality and build value additional software to create distributed functionality. While networks will become flatter and more dynamic, the resource allocation and predictability of application behavior across this hybrid and heterogenous network can provide great benefits.

In conventional walled garden (or siloed) mobile networks, authentication is done within each network or with a roaming partner using the 3GPP standard defined interface. While this can work in centralized networks, in an edge centric and distributed networks scenario, this authentication process can be cumbersome. Using the techniques described herein, authentication can be managed in a distributed way with networks created as neutral connectivity networks. In some embodiments, a federated authentication can be created across several smaller networks that are connected using mobile network fabric created using cloud mesh links. In some embodiments, authentication information may be shared via cloud mesh links. For example, authentication for a UE can be performed by a control layer, and that authentication can be shared with other network functions and further authentication by the network functions may not be performed. Observability of such distributed network can also be achieved via cloud mesh links. As described herein, authentication can be performed seamlessly without redundant authentication, which can lead to latency issues, and it can do so without sacrificing security.

Network functions and services can work across multi cloud infrastructure, and they can be managed and configured in an autonomous way. The mobile connectivity fabric can make the network behavior for 4G, 5G, 6G and WiFi network functions self-optimizing and make the network self-driving. This self-driving network built using smart mobile connectivity fabric will also enable intelligent edge services, analytics as well as smart in line services. The mobile network functions realized using this fabric are MME, SGW, PGW, AMF, SMF, UPF, NWDAF, NSSF, NRF, UDM, UDR, AUSF, PCF/PCRF, ePDG, TWAG, N3IWF, AGF, security GW, CU, inline services such as (but not limited to) NAT, DPI, etc.

The network functions of the fabric may be geographically distributed and may form ad-hoc mesh where the cloud mesh links may be realized using different technologies such as block chain. Cloud mesh links utilized by the edge managers can be used for creating this fabric, where the edge manager may be comprised of one or more of the mobile network functions, as described above. The mobile network functions that comprise this fabric are developed using AI/ML in different aspects of the system to make it a smart fabric. The use of AI/ML can enable more robust autonomous and self-driving networks.

Figure 4:
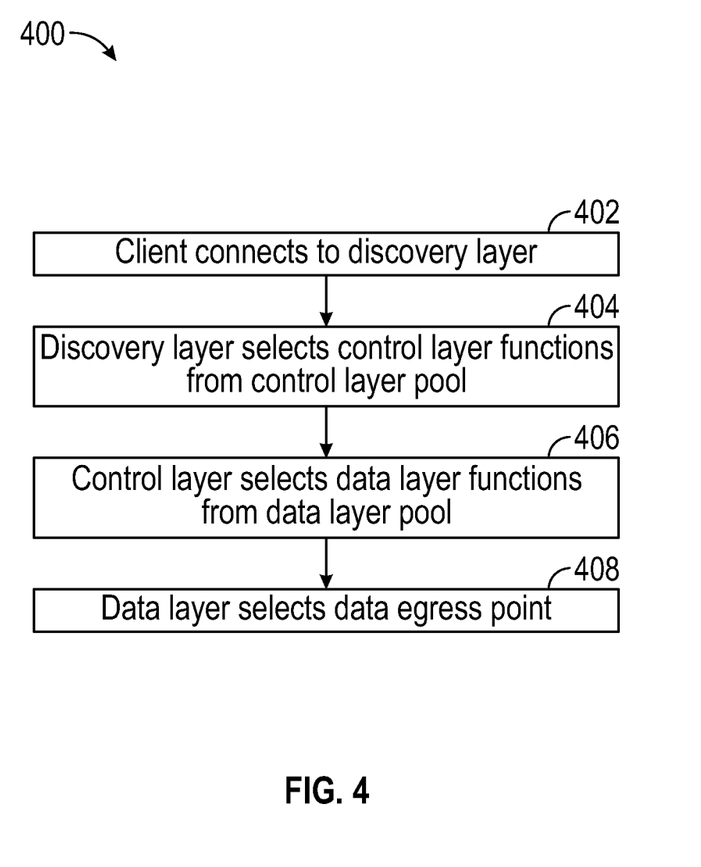
FIG. 4 illustrates a flow diagram for a method for autonomous resource allocation, in accordance with some embodiments of the present disclosure.

FIG. 4 illustrates a flow diagram for a method 400 for autonomous resource allocation, in accordance with some embodiments of the present disclosure. The method 400 may be executed by one or more service nodes (e.g., service nodes 302, 312, 322, 332). At operation 402, a client connects to a discovery layer (also referred to as a service discovery layer) of a service node. The client may be a networking client, such as a server-client model. The client may be a service and referred to as a client service.

The discovery layer may provide a discovery function and be provided in an edge manager resident in the service node, for example. The discovery layer may use ML logic, as described in further detail below, to determine the type of service and resource demand by the connected client. In some embodiments, the client may directly communicate this service and resource demand information. For example, the client may be programmed with service discovery layer information, which may be discovered via mechanisms such as DNS (Domain Name System). In some embodiments, the ML logic may predict the type of service and resource demand based on historical behavior. For example, based on past behavior and time of day, the discovery layer may predict that the client's service demand is streaming and may determine the resource demand accordingly.

The discovery layer may perform various functionalities such as security, authentication, load distribution, latency, capacity, traffic steering, traffic optimization, Network slicing, QoS management, redundancy/resilience of the network function, configuration along with machine learning logic that optimizes the environment parameters and helps redirect the clients to appropriate next layers (e.g., control layer). The discovery layer may also provide parameters for the clients, which may contain state, configuration, security and alarm information along with list of next layer information that would help clients reach and connect with next layers. The discovery layer also may instruct clients about sequencing of the various layers, including different types of control and data layers. In some embodiments, clients may choose to come back to the discovery layer in between the flow many times.

At operation 404, the discovery layer may choose control layer functions from a control layer pool based on the predicted type of service and resource demand. The discovery layer may use ML logic, which may include factors such as cost, distance, load, latency, use of renewable energy, resiliency, service types, etc., to select the control layer functions from the control layer pool. The control layer pool may include control layer functions distributed across one or more service nodes connected by the mesh fabric. That is, one or control layer functions may be provided at a first service node and one or more control layer functions may be provided by a second service node. The control layer may provide authentication using network functions such as AMF, SMF, MME, HHS, AUSF, etc. The control layer may provide network slicing management, resource management using network functions such as NSSF, NRF.

The control layer may perform various functionalities such as security, authentication, load distribution, traffic steering, traffic optimization, latency, capacity, Network slicing, QoS management, redundancy/resilience of the network function, configuration along with machine learning logic that optimizes the environment parameters and helps redirect the clients to appropriate next layers (e.g., another control or data layer). The control layer may also provide parameters for the clients, which may contain state, configuration, security and alarm information along with list of next layer information that would help clients reach and connect with next layers.

The control layer may also instruct clients about sequencing of the various layers, including different types of control and data layers or suggest to a client to go back to service discovery layer. Clients may choose to come back to control layer in between the flow one or more times.

At operation 406, the control layer may choose data layer functions from a data layer pool. The control layer may make the selection of data layer functions based on the predicted type of service and resource demand. The control layer may use ML logic, which include factors such as cost, distance, load, latency, use of renewable energy, resiliency, service types, etc., to pick the data layer functions from the data layer pool. The data layer pool may include data layer functions distributed across one or more service nodes connected by the mesh fabric. The data layer may provide data traffic routing using network functions such as UPF, S-GW, P-GW, etc.

The data layer may perform various functionalities such as security, authentication, load distribution, latency, capacity, traffic steering, traffic optimization, Network slicing, QoS management, redundancy/resilience of the network function, configuration along with machine learning logic that optimizes the environment parameters and helps redirect the clients to appropriate next layers (e.g., another data layer). The data layer may also provide parameters for the clients, which may contain state, configuration, security and alarm information along with list of next layer information that would help clients reach and connect with other layers.

The data layer may also instruct clients about sequencing of the various layers, including different types of control and data layers or suggest to a client to go back to service discovery layer. Clients may choose to come back to data layer in between the flow one or more times. The data layer may also help egress traffic to the nearest optimal host as well as traffic shaping based on ML logic and environment parameters.

At operation 408, the data layer may choose to select a data egress point to offer the requested service to the client. The data layer may make the selection of the data egress point based on the predicted type of service and resource demand. The data layer may use ML logic, which include factors such as cost, distance, load, latency, use of renewable energy, resiliency, service types, etc., to pick the data egress point. The data egress may be closer to the desired service, for example a private network. Data egress point can be a specific UPF, S-GW/P-GW, etc., for providing better quality of experience to the user. For example, one data egress may be more suitable for streaming, another may be more suited for low latency applications or may be more cost effective. Data egress point selection may depend on the data center capabilities/resources available at a specific time of the day.

Method 400 may be used to create the connectivity fabric and provide service continuity across heterogenous compute and networking structures. The connectivity fabric may be serverless and may run on computing resources with processor and capability settings.

Discovery, control, and data layer functionalities allow clients to work through these layers. The discovery, control, and data layers (and their instances) may communicate with other on secure backend to share states, configuration, security parameters, load and other environmental information and parameters. These layers may sync up on the back end that allows clients to seamlessly connect to different instances hosted on different places. Logic (using ML and programmed) helps clients to connect to optimal layers and locations. The back-end connection allows seamless movement of the layers from one host (or provider) to another host (or provider). When clients reach to a layer instance, that instance will already have the information needed to service the clients who may have been on different instance previously. This peer-to-peer communication and movement of layers (and their instances) allows east-west movement of traffic. This also enables forking, replicating, along with routing of streams of data based on the applications need.

The different layers may instruct a client to go to different (or same) layers or some sequence of layers/service type. Each layer may have multiple instances (and hosts) that may specialize different type of services. For example, different service types within control layer may cover service1, service2, service3, etc. Likewise, data layers and discovery layers may also have different types of instances that serve different types of services. In some embodiments, some layer parameters may be statically configured in the client, and in these scenarios, the statically configured layer parameters may be skipped in a call flow sequence.

The autonomous network function management techniques described herein provide a scalable cost-effective solution to the rapid growth of cloud-based services and user consumption. The autonomous network function management techniques provide numerous benefits of conventional systems that use static, centralized management techniques. Conventional systems cannot take advantage of the different cloud resources available across different providers. In contrast, the autonomous network function management techniques can allocate network functions across different service nodes, cloud providers, network types (public, private). These techniques leverage AI/ML based distribution across various resources (local or various cloud providers), which solves the constraints of a given resource. These techniques also leverage local or cloud compute seamlessly and pairs the end user services with the nearest cloud egress by using ML-based intelligence. Currently in operator's world (e.g., enterprise, public), most of the networking software are either hosted locally or on a given cloud provider. The autonomous network function management techniques leverage local and cloud resources seamlessly for different types of network and use cases.

The autonomous network function management techniques provide an efficient, cost-effective solution over conventional systems, which do not work across many cloud and local servers seamlessly and are constrained by the limits of a given resource such as latency, throughput, costs. In contrast, the autonomous network function management techniques are capable of leveraging AI/ML based distribution across resources (local or various cloud providers in a hybrid and/or multi cloud environment), which can reduce or eliminate the constraints of a given resource.

The techniques combine AI/ML techniques with elastic expansion to create an ad-hoc smart network or smart mobile connectivity fabric that is built in an edge native manner. This smart mobile connectivity fabric enables peer to peer services and existing mobile and wireline services with service continuity and unified service experience across hybrid and multi cloud infrastructure.

The ML logic (on any or all the layers) may collect information from different resources. The ML logic (on any or all the layers) may be constantly training (online and offline) and refining the models based on inputs from various layers. These inputs may include environmental information as well as configuration such as service request types, client types, network information, energy types and costs, etc. These inputs also may include known clients and their service requests to help provide known data and validation data sets. The layer specific trained models may be periodically uploaded onto each layer and their prediction statistics/results may be again fed back into training model to constantly improve this process.

Figure 5:
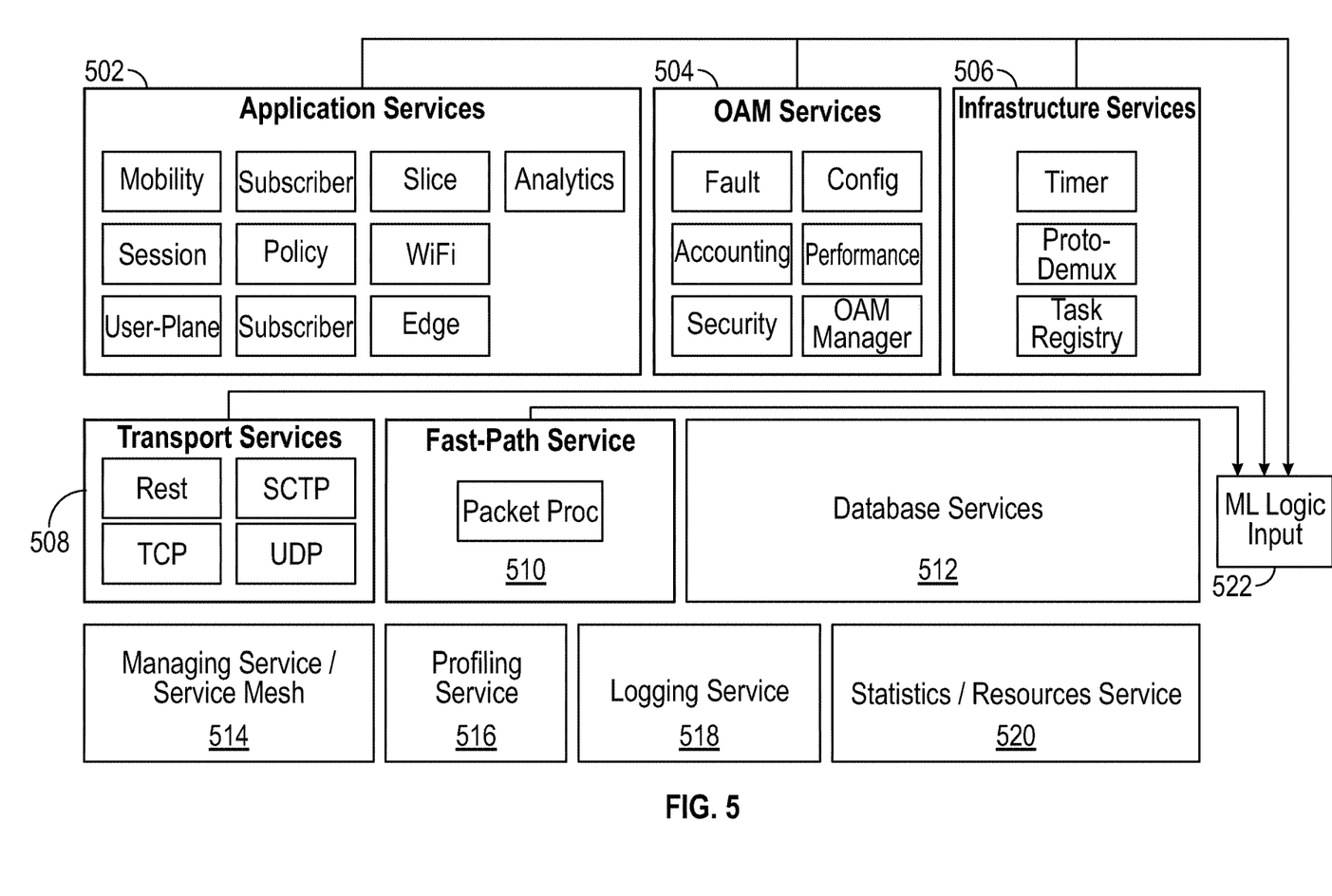
FIG. 5 illustrates example portions of an input system for ML logic, in accordance with some embodiments of the present disclosure.

FIG. 5 illustrates example portions of an input system for ML logic, in accordance with some embodiments of the present disclosure. Network and other functions provided by service nodes can be grouped in by services. As shown in FIG. 5, Application Services 502, Operations and Management (OAM) Services 504, Infrastructure Services 506, Transport Services 508, Fast-Path Services 510, Database Services 512, Messaging Services (Service Mesh) 514, Profiling Services (Crashes/Trace) 516, Logging Services 518, and Resource Services 520 may be provided along with a ML logic input 522.

Application Services 502 may include mobility-related network functions such as AMF, MME; subscriber-related network functions such as UDM, AUSF, HSS; slice-related network functions such as NSSF, NEF, NRF; analytics-related network functions such as NWDAF, AI/ML logic; session-related network functions such as SMF, S/PGW-C; policy-related network functions such as PCF, PCRF; WIFI-related network functions such as N3/WF, ePDG; user-plane-related network functions such as UPF, S/PGW-U; charging-related network functions such as CHF, OCS, OFCS; and edge-related network functions such as V/HSEPP, MGR. Application Services 502 may provide inputs to the ML logic input 522. For example, the different network functions in the Application Services 502 may provide inputs to train and refine the ML logic (on any or all the layers).

OAM Services 504 may include fault-related functions such as events, alarms; configuration-related functions such as Conf, Prov, LCM; accounting-related functions such as OAM account services; performance-related functions such as statistics, KPIs; security-related functions such as user, service security policies; OAM manager-related functions. OAM Services 504 may provide inputs to the ML logic input 522. For example, the different functions in the OAM Services 504 may provide inputs to train and refine the ML logic (on any or all the layers).

Infrastructure Services 506 may include timer-related functions, demultiplexing-related services, and task registry related functions. Infrastructure Services 506 may provide inputs to the ML logic input 522. For example, the different functions in the Infrastructure Services 506 may provide inputs to train and refine the ML logic (on any or all the layers).

Transport Services 508 may be associated with ingress and egress data points and may include REST interface related functions, TCP related functions, SCTP related functions, and UDP related functions. Transport Services 508 may provide inputs to the ML logic input 522. For example, the different functions in the Transport Services 508 may provide inputs to train and refine the ML logic (on any or all the layers).

Fast-path Services 510 may include packet-procedure function such as VPP graph nodes. Fast-path Services 510 may provide inputs to the ML logic input 522. For example, the different functions in the Fast-path Services 510 may provide inputs to train and refine the ML logic (on any or all the layers).

Figure 6:
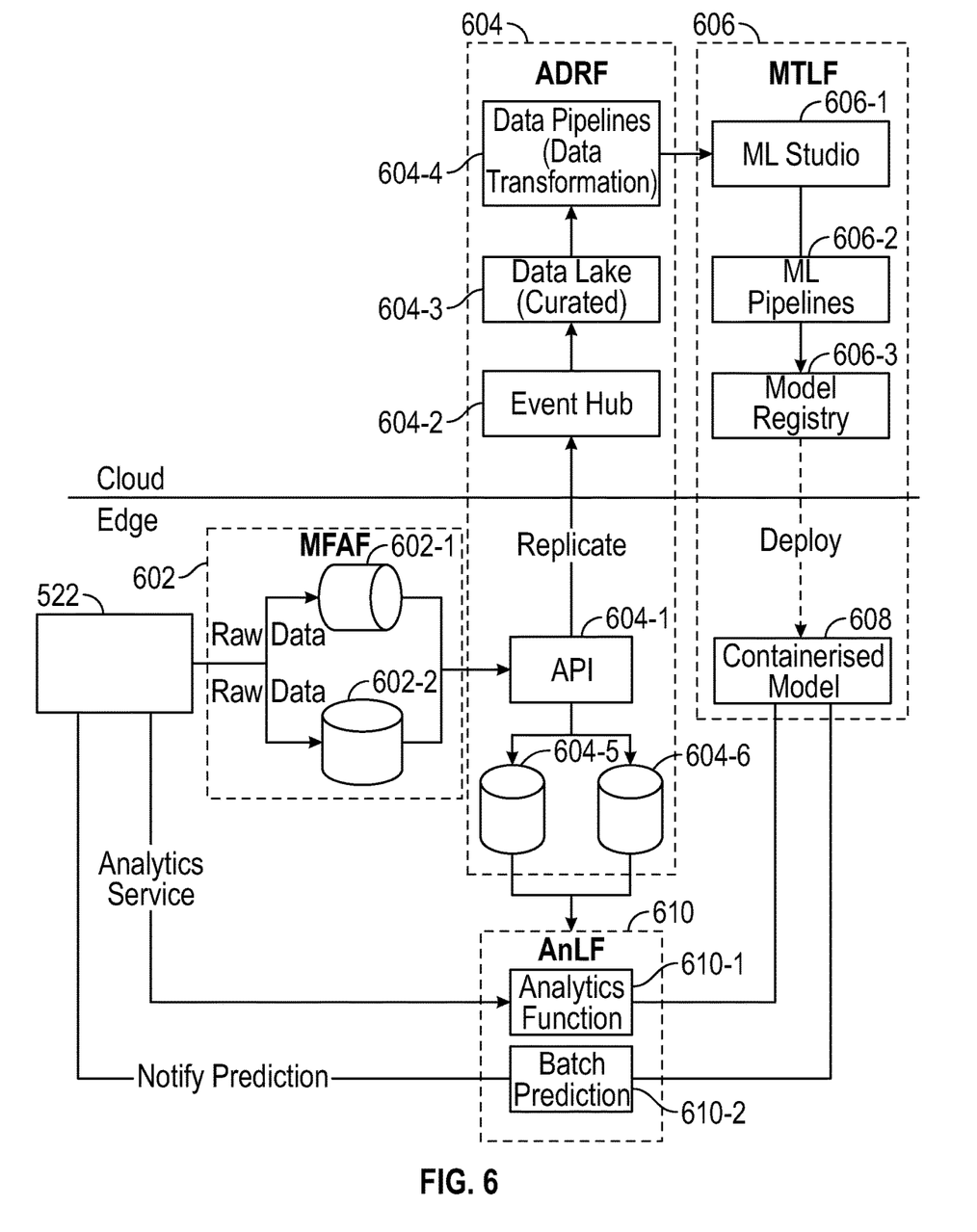
FIG. 6 illustrates example portions of a training and refining infrastructure for ML logic, in accordance with some embodiments of the present disclosure.

FIG. 6 illustrates example portions of a training and refining infrastructure for ML logic, in accordance with some embodiments of the present disclosure. The training and refining infrastructure may be distributed across edge (e.g., service node) and cloud locations. Information collected by ML logic input 522, as described above, may be used to train and refine the ML logic (on any or all layers). The collected information may be inputted to a Messaging Framework Adaptor Function (MFAF) 602. The collected information here may be transmitted to the MFAF 602 in its raw data form. The MFAF 602 may include one or more databases 602-1, 602-2 to provide a streaming platform and monitoring platform to generate relevant metrics from the raw collected information. The metric data from MFAF 602 may be input into an Analytical Data Repository Function (ADRF) 604, which may include an application programming interface (API) 604-1 for use with various programming languages such as python (e.g., PySpark). On the cloud side, the ADRF 604 may include an event hub 604-2, a data lake 604-3, and data pipelines 604-4, which may be used to train the ML logic.

On the cloud side, the ADRF 604 may be coupled to a Model Training Logical Function (MTLF) 606. The MTLF 606 may include a ML studio 606-1, ML pipelines 606-2, and a model registry 606-3. The MTLF 606 may deploy a ML model 608 (ML logic), which may be a containerized model. The ML model 608 may be refined using the collected information by the ML logic input 522. For example, the ADRF 604 may include one or more databases 604-5, 604-6 coupled to the API 604.1 on the edge-side (e.g., service node). The databases 604-5, 604-6 may be provided as relational database management system to store and organize the metric data. The databases 604-5, 604-6 may be coupled to Analytical Logical Function (AnLF) 610. The AnLF 610 may include an Analytics Function 610-1 and a Batch Prediction 610-2. The AnLF 610 may also be coupled to the ML logic input 522 and may receive Analytic Service and Notify Prediction information. The AnLF 610 may be coupled to the ML model 608 to refine the ML model 608 based on the newly received information.

The autonomous network function management techniques can use ML, deep learning, neural networks to add smart decision making to create self-driving networks. The autonomous network function management techniques can be used to enable intelligent network services such as cognitive heterogenous network, autonomous network operation, resource adaptation, fault detection and recovery, efficient and dynamic network slicing, intelligent application-edge selection, distributed data-derive architecture, etc. The techniques can be used for signaling and management optimization such as dynamic function selection, paging optimizations, TAU (Tracking Area Update) reduction, mobility pattern prediction, inter- and intra-RAT handover, network function resource optimization, proactive resource allocation, predictive caching, energy saving, UE reachability management, user profile updates, UE location optimization predictive load-balancing, bearer pre-configuration, base station clustering (based on different criteria), control plane latency (based on mobility patterns). The techniques can be used for smart user (data) plane optimizations such as traffic classification, longer term traffic forecasting, intelligent packet routing, multi-RAT traffic steering, smart traffic mirroring, energy savings. The techniques can also be used for smart inline services and security optimizations such as combating use of counterfeit ICT devices (identifying cloned devices), replay protection, detecting abnormal activity, DDoS (Distributed Denial of Service) attack prevention.

UE battery life saving (e.g., TAU reduction) is an example of optimization based on using ML logic in the different layers, as described herein. The ML logic in the different layers can be used to select control layer network functions to reduce TAUs and thus saving battery life of the UE. The number of TAUs impact battery life of the UE. A UE typically stays idle for 70-80% of the time. The UE releases the signaling connection towards the core network; therefore, the core network must reach out to the UE when downlink data is available. To strike a balance between the amount of paging to be done across multiple cell towers to reach out to the UE versus the number of updates that UE must perform to keep notifying of its location can be challenging. Here, ML logic, as described herein, in the different layers can use the UE movement history and predict the UE tracking area. The core network can the use this predicted UE tracking area while trying to reach the UE and therefore the UE can roam across a wider area without performing updates. This leads to more efficient paging and less TAUs. As UE will perform less updates, UE battery life will be conserved. The core network can also reduce resource usage, which can lead to reduction in cost.

UE reachability management is an example of optimization based on using ML logic in the different layers, as described herein. Power savings modes for low power devices and "discontinuous reception" (DRX) modes for regular devices can be defined. When a UE goes into idle mode, rebuilding the connection with the core network can be an costly operation. Hence, UE's behavior of when it becomes active, for how long, idle time, time of day, etc., can impact battery life. For example, the ML logic in the different layers can use data for how the UE stays idle and time of day, and the MME/AMF functions can use the predicted parameters based on the collected information and push UE to lower power mode or higher DRX if its not supposed to remain active. Also, if the UE is supposed to remain active, then the MME/AMF functions can keep the connection with the UE alive longer. This leads to improved UE battery life and network resource savings because efficient DRX management impacts UE battery life, and MIME, AMF can save CPU resources and time because the connection with the UE does not have to built numerous times.

Handover optimization is an example of optimization based on using ML logic in the different layers, as described herein. Handover management for 5G networks has gotten more complex than 4G networks and has more stringent requirements, such as almost "zero" latency handover and consistent user experience. For example, the ML logic in the different layers can use the following data for prediction: history information such as reference signal received power/quality (RSRP/RSRQ), network load, throughput, interruption time, awareness and prediction of the UE position, moving direction, and speed. Optimized and improved handover, using the techniques described herein, therefore can offer better, KPIs, user experience, and application continuity.

Application-edge selection can be improved using ML logic in the different layers, as described herein. With 5G, data traffic is expected to grow, and decentralization of the network with multiple locations with UPFs may become more prevalent. Selecting the UPF for the user may depend on user location. However, multiple far-edge data centers availability, each with acceptable latency, may make the UPF selection challenging. For example, the ML logic in the different layers can use the following data for prediction: UE's type of PDU/PDN session, predicted UE activity period, predicted UPF congestion levels of nearby edge UPFS during activity period, predicted UE movement (reducing relocation to different UPFs frequently). Application-edge selection, using the techniques described herein, therefore can offer better application and user experience with uninterrupted data transfer, enabling application cluster, etc.

Load balancing can be improved using ML logic in the different layers, as described herein. Typically, load balancing across core network resources is static and only performed when a new connection request is received. However, resource requirements are dynamic at location based on time of day, periodic events. Traffic and throughput spikes from cells currently handled by a network resource (e.g., UPF) can lead to resource requests being denied by the core network leading to degradation in user experience. For example, the ML logic in the different layers can use the following data for prediction: cell loads fro the next interval (e.g., hour), cell groups so that predicted required throughput is similar across groups, dynamic change of cell membership in group for load balancing. Load balancing, using the techniques described herein, therefore can offer better application and user experience with uninterrupted data transfer, improved application throughput.

Abnormal activity detection can be improved using ML logic in the different layers, as described herein. For example, IoT (Internet of Thing) devices are increasing, and they are more susceptible to being hacked or misused. ML logic in the different layers can be improve abnormal activity detection because the ML logic can flag abnormal behavior, such as stationary device registering at a different location, unexpected high data rate used by a device, unexpected wake-up time, un-expected recipients of data transmission, simultaneous activity (e.g., DDoS attacks). Corrective action can be taken earlier based on early detection to resolve possible abnormal issues.

Microservice resource management can be improved using ML logic in the different layers, as described herein. Application microservices can have dynamic scaling requirements, which provides challenges for far-edge data centers, especially with resource limitations, to provide similar scaling needs. ML logic can predict the dynamic scaling needs for different applications based on traffic history, time of day, cluster resource activity. ML logic can be used to detection application anomalies and take corrective action quickly before failures can create a cascading effect resulting in the entire system failing and leading to service disruption. Thus, ML logic optimization can lead to lowering cost of deploying and maintaining far-edge data centers, which are responsive to load and traffic changes, leading to minimizing service disruption.

Figure 7:
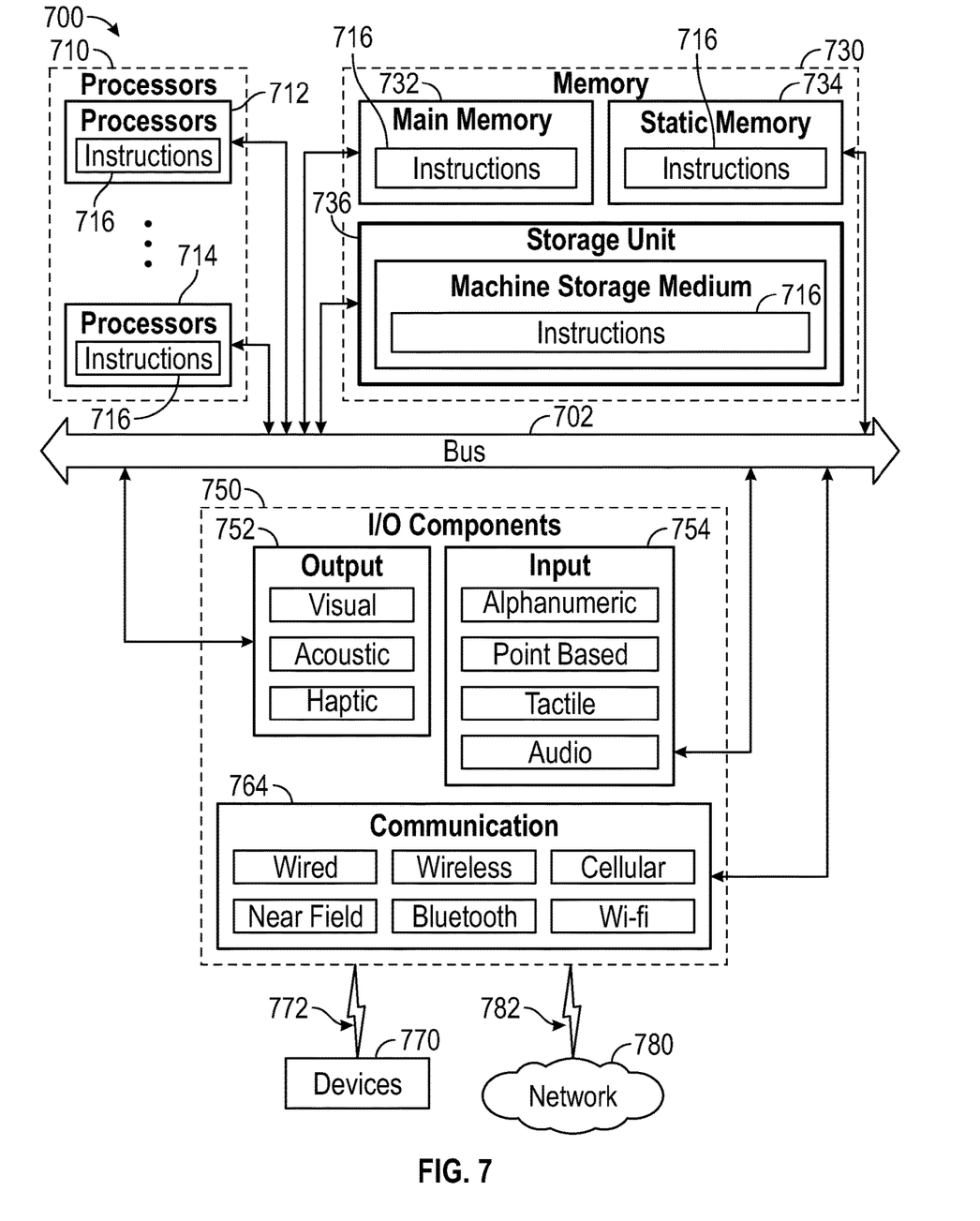
FIG. 7 illustrates a diagrammatic representation of a machine in the form of a computer system within which a set of instructions may be executed for causing the machine to perform any one or more of the methodologies or techniques discussed herein, in accordance with some embodiments of the present disclosure.

FIG. 7 illustrates a representation of a machine 700 in the form of a computer system within which a set of instructions may be executed for causing the machine 700 to perform any one or more of the methodologies and techniques discussed herein. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example, the instructions 716 may cause the machine 700 to execute any one or more operations of any one or more of the methods described herein. As another example, the instructions 716 may cause the machine 700 to implement portions of the data flows described herein. In this way, the instructions 716 transform a general, non-programmed machine into a particular machine 700 (e.g., service nodes, orchestrator nodes, edge managers, etc.) that is specially configured to carry out any one of the described and illustrated functions in the manner described herein.

In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 includes processors 710, memory 730, and input/output (I/O) components 750 configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors 710 that may comprise two or more independent processors (sometimes referred to as "cores") that may execute instructions 716 contemporaneously. Although FIG. 7 shows multiple processors 710, the machine 700 may include a single processor with a single core, a single processor with multiple cores (e.g., a multi-core processor), multiple processors with a single core, multiple processors with multiple cores, or any combination thereof.

The memory 730 may include a main memory 732, a static memory 734, and a storage unit 736, all accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 include components to receive input, provide output, produce output, transmit information, exchange information, capture measurements, and so on. The specific I/O components 750 that are included in a particular machine 700 will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, and other communication components to provide communication via other modalities. The devices 770 may be another machine or any of a wide variety of peripheral devices (e.g., a peripheral device coupled via a universal serial bus (USB)). For example, as noted above, the machine 700 may correspond to any one of the service nodes, edge managers, orchestrator nodes, etc., described herein, and the devices 770 may include any other of these systems and devices.

The various memories (e.g., 730, 732, 734, and/or memory of the processor(s) 710 and/or the storage unit 736) may store one or more sets of instructions 716 and data structures (e.g., software) embodying or utilized by any one or more of the methodologies or functions described herein. These instructions 716, when executed by the processor(s) 710, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network such as those defined by various standard-setting organizations, other long-range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., hypertext transfer protocol (HTTP)). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A method comprising:
   receiving a connection request from a client service;
   connecting the client service to a discovery layer;
   determining, by the discovery layer, a service type and resource demand from the connected client based on the connection request;
   selecting, autonomously by the discovery layer, control layer functions from a control layer pool distributed across a plurality of service nodes using at least a first machine-learning model trained for the discovery layer based on the determined service type, wherein at least one selected control layer function is provided by a first service node,
    wherein the control layer functions provides authentication for the client service;
transmitting, by the discovery layer, discovery layer parameters to the at least one selected control layer function provided by the first service node;
selecting, autonomously by the control layer in the first service node, data layer functions from a data layer pool distributed across the plurality of service nodes using at least a second machine-learning model trained for the control layer based on the determined service type, wherein at least one selected data layer function is provided by a second service node,
    wherein the data layer functions provide data trafficking for the client service;
transmitting, by the control layer, control layer parameters to the selected data layer functions provided by the second service node;
selecting, autonomously by the data layer in the second service node, a data egress point to offer the client service using at least a third machine-learning model trained for the data layer based on the determined service type;
transmitting, by the data layer, data layer parameters to the selected data egress point;
defining a connectivity fabric using cloud mesh links, the connectivity fabric including the selected control layer functions, data layer functions, and data egress points based on the discovery layer parameters, control layer parameters, and data layer parameters; and
providing, by the connectivity fabric, the client service using the selected control layer functions, data layer functions, and data egress point.

2. The method of claim 1, wherein the discovery layer, control layer, and data layer communicate using backend network connections and share environmental information.

3. The method of claim 1, wherein the first service node is associated with a first network and the second service node is associated with a second network.

4. The method of claim 3, wherein the first network is a public operator network and the second network is a private enterprise network.

5. The method of claim 3, wherein a federated authentication is performed by control layer functions and shared with other functions.

6. The method of claim 1, wherein determining the service type and resource demand is predicted based on historical behavior.

7. A system comprising:
at least one hardware processor; and
at least one memory storing instructions that, when executed by the at least one hardware processor, cause the at least one hardware processor to perform actions comprising:
receiving a connection request from a client service;
connecting the client service to a discovery layer;
determining, by the discovery layer, a service type and resource demand from the connected client based on the connection request;
selecting, autonomously by the discovery layer, control layer functions from a control layer pool distributed across a plurality of service nodes using at least a first machine-learning model trained for the discovery layer based on the determined service type, wherein at least one selected control layer function is provided by a first service node,
    wherein the control layer functions provides authentication for the client service;
transmitting, by the discovery layer, discovery layer parameters to the at least one selected control layer function provided by the first service node;
selecting, autonomously by the control layer in the first service node, data layer functions from a data layer pool distributed across the plurality of service nodes using at least a second machine-learning model trained for the control layer based on the determined service type, wherein at least one selected data layer function is provided by a second service node,
    wherein the data layer functions provide data trafficking for the client service;
transmitting, by the control layer, control layer parameters to the selected data layer functions provided by the second service node;
selecting, autonomously by the data layer in the second service node, a data egress point to offer the client service using at least a third machine-learning model trained for the data layer based on the determined service type;
transmitting, by the data layer, data layer parameters to the selected data egress point;
defining a connectivity fabric using cloud mesh links, the connectivity fabric including the selected control layer functions, data layer functions, and data egress points based on the discovery layer parameters, control layer parameters, and data layer parameters; and
providing, by the connectivity fabric, the client service using the selected control layer functions, data layer functions, and data egress point.

8. The system of claim 7, wherein the discovery layer, control layer, and data layer communicate using backend network connections and share environmental information.

9. The system of claim 7, wherein the first service node is associated with a first network and the second service node is associated with a second network.

10. The system of claim 9, wherein the first network is a public operator network and the second network is a private enterprise network.

11. The system of claim 9, wherein a federated authentication is performed by control layer functions and shared with other functions.

12. The system of claim 7, wherein determining the service type and resource demand is predicted based on historical behavior.

13. A machine-storage medium embodying instructions that, when executed by a machine, cause the machine to perform actions comprising:
receiving a connection request from a client service;
connecting the client service to a discovery layer;
determining, by the discovery layer, a service type and resource demand from the connected client based on the connection request;
selecting, autonomously by the discovery layer, control layer functions from a control layer pool distributed across a plurality of service nodes using at least a first machine-learning model trained for the discovery layer based on the determined service type, wherein at least one selected control layer function is provided by a first service node,
    wherein the control layer functions provides authentication for the client service;

transmitting, by the discovery layer, discovery layer parameters to the at least one selected control layer function provided by the first service node;

selecting, autonomously by the control layer in the first service node, data layer functions from a data layer pool distributed across the plurality of service nodes using at least a second machine-learning model trained for the control layer based on the determined service type, wherein at least one selected data layer function is provided by a second service node, wherein the data layer functions provide data trafficking for the client service;

transmitting, by the control layer, control layer parameters to the selected data layer functions provided by the second service node;

selecting, autonomously by the data layer in the second service node, a data egress point to offer the client service using at least a third machine-learning model trained for the data layer based on the determined service type;

transmitting, by the data layer, data layer parameters to the selected data egress point;

defining a connectivity fabric using cloud mesh links, the connectivity fabric including the selected control layer functions, data layer functions, and data egress points based on the discovery layer parameters, control layer parameters, and data layer parameters; and providing, by the connectivity fabric, the client service using the selected control layer functions, data layer functions, and data egress point.

14. The machine-storage medium of claim 13, wherein the discovery layer, control layer, and data layer communicate using backend network connections and share environmental information.

15. The machine-storage medium of claim 13, wherein the first service node is associated with a first network and the second service node is associated with a second network.

16. The machine-storage medium of claim 15, wherein the first network is a public operator network and the second network is a private enterprise network.

17. The machine-storage medium of claim 15, wherein a federated authentication is performed by control layer functions and shared with other functions.

18. The machine-storage medium of claim 13, wherein determining the service type and resource demand is predicted based on historical behavior.

* * * * *